2,964,521

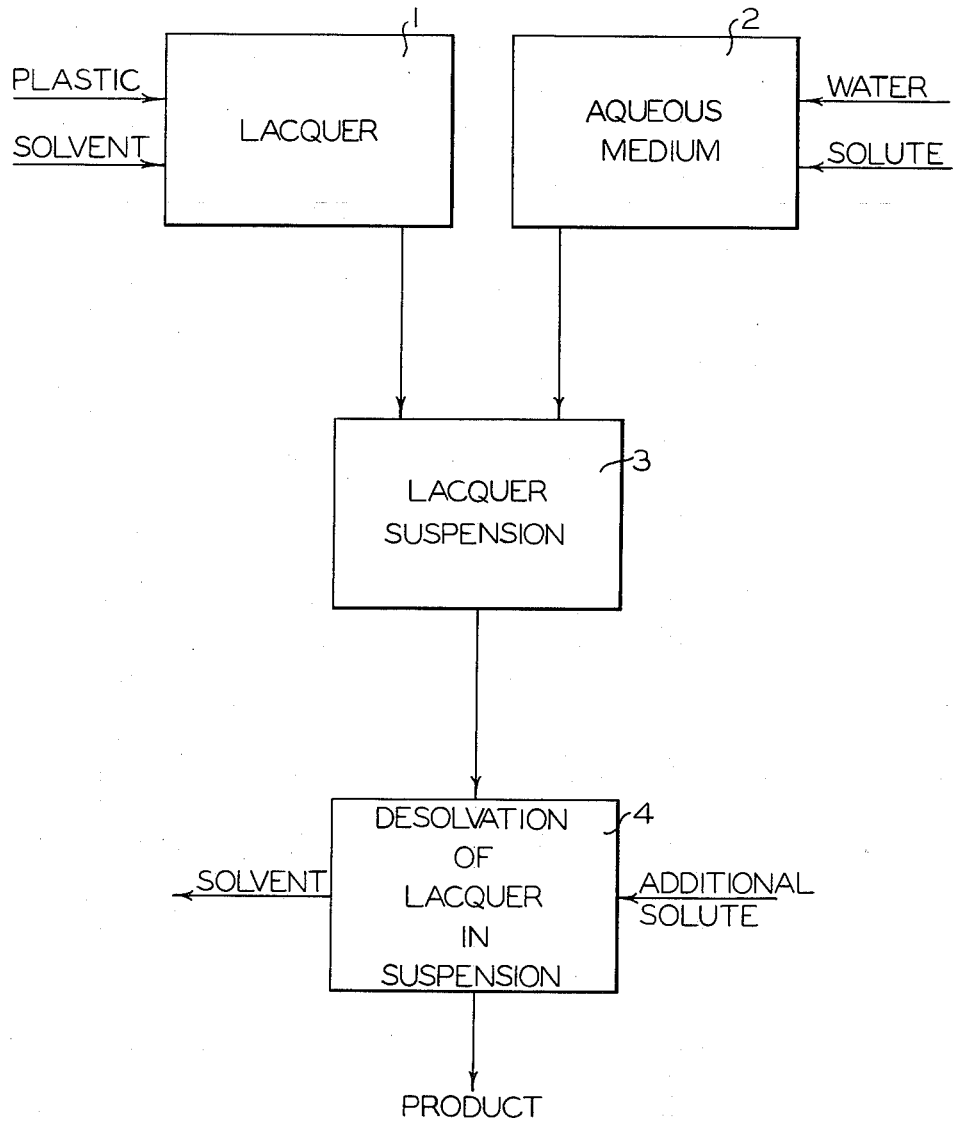

TREATMENT OF PLASTICS

Ralph E. Coffee, Berkeley, Mo., assignor to Olin Mathieson Chemical Corporation, East Alton, Ill., a corporation of Virginia Filed Mar. 4, 1958, Ser. No. 718,976

5 Claims. (Cl. 260—223)

This invention relates to the treatment of plastics and particularly to the manufacture of relatively large spherical particles of water insoluble organic plastic material.

Various methods for the preparation of spherical and near-spherical particles of organic plastic materials have heretofore been proposed. While such processes are generally quite satisfactory in the manufacture of relatively small spherical particles having an average diameter up to about 0.020 inch, they have been exceedingly disappointing in attempted adaptations to the preparation of particles having minimum average diameters of 0.070 inch. Spherical particles of plastic organic material have traditionally been prepared by suspending a lacquer of the material in water and evaporating the solvent from the suspended lacquer particles. Such a system is typified by the teachings of Olsen, Tibbets and Kerone in U.S. Patent 2,027,114. Processes of this type are necessarily limited to the production of relatively small spheres of plastic material. When attempts were made to obtain relatively large plastic spheres by such methods, it was found that the amount of agitation required to keep the lacquer particles suspended would break down the lacquer particles so as to yield relatively small spherical bodies. On the other hand, when the lacquer was made more concentrated to resist the disintegrating and distorting effect of the agitation, the lacquer was too rigid for spheriodization. Although the desirability of providing a simple process for the manufacture of relaively large pastic spheres for use as propellants, molding powders, heat insulation and dielectric applications has long been recognized, such products could not be obtained by the prior art processes.

Schaefer, in U.S. Patent 2,160,626, taught that suspended lacquer particles containing a small amount of water could be densified by the addition of a suitable solute to the liquid medium in which the globules were suspended. While such a process is particularly efficacious in preparing high density globules having average diameters in excess of approximately 0.020 inch, it exhibits no tendency whatsoever to increase the diameter of the product.

More recently, the process for the manufacture of spherical particles of plastic material by removal of its solvent after the particles have become rounded while suspended in an aqueous medium has been materially improved by presizing the particles to be formed before or at their point of introduction into the suspending medium. While this modification does provide for the manufacture of slightly larger spheres or sphere-like bodies, it still has the restriction that was inherent to the original processes. Thus, here again the size of the particles is limited because in the manufacture of large particles, the agitation necessary to keep them in suspension results in their subdivision or distortion.

It is, therefore, an object of this invention to provide a novel process for the preparation of spherical particles of plastic material overcoming the disadvantages of the prior art. Another object of this invention is to provide a novel process for the preparation of relatively large spherical particles of organic plastic material. A more specific object of this invention is to provide an efficient process for obtaining uniformly dimensioned substantially spherical plastic particles having a minimum average diameter of about 0.070 inch.

In accordance with this invention, these and other objects are accomplished, generally speaking, by spheroidizing and removing the solvent from a lacquer of a water insoluble plastic material while suspended in a liquid aqueous medium in which the lacquer will have little or no tendency to rise or fall because of density. More specifically, the invention contemplates the production of spherical or globular particles of a water insoluble organic plastic material having a diameter of about 0.070 inch or larger by dissolving the plastic material in a solvent to form a lacquer, suspending particles of the lacquer in an aqueous liquid medium having a density substantially equal to the density of the lacquer and removing the solvent from the suspended lacquer particles after they have become rounded. The densities of the lacquer and the suspending medium are maintained substantially equal so as to prevent or minimize any tendency of the lacquer to segregate from the medium in which it is suspended. In actual practice, absolute equality between the densities of the suspended lacquer and the suspending medium cannot be maintained at all times because the lacquer increases appreciably in density while the solvent is being removed from it. Thus, the density of the suspending medium is normally increased incrementally when the suspended globules show any tendency to migrate toward the bottom of the suspending medium.

The density of the suspending medium is adjusted to closely approximate that of the suspended lacquer particles by the addition of a solid solute to the suspending medium. The solute can be dissolved in a small quantity of water and the concentrated solution added to the aqueous medium. In most cases, however, it has been found preferable to add the solute in solid form to the agitated aqueous medium. Any solute whose solutions have densities greater than that of water can normally be used provided that they have no adverse effect upon the particular plastic material being treated. Suitable solutes include sodium sulfate, barium nitrate, potassium nitrate, sugar, aluminum sulfate, magnesium sulfate, sodium chloride, sodium nitrate, potassium sulfate, and the like. In order to achieve the advantages of this invention, the density of the suspending medium during the rounding and solvent removal of the lacquer globules must generally be between about 1.03 and about 1.25 grams per cc. When the suspending medium has a density below about 1.03 grams per cc., the increased agitation required to maintain the lacquer particles in suspension causes the subdivision and distortion of the particles. When exceedingly heavy suspending media having a density greater than about 1.25 grams per cc. are used, the amount of energy required to agitate the system and the quantity of solute required are inordinate and do not enhance the properties of the product obtained.

After the lacquer bodies suspended in the aqueous liquor have become spherical, they are rendered solid by separating the solvent from them. This can be accomplished by heating the suspension up to or slightly below the boiling point of the solvent and maintaining this elevated temperature until substantially all of the solvent is removed. Alternatively, the solvent can be removed by elutriation, air stripping or equivalent methods.

A protective colloid is also present in the aqueous medium to prevent collision and agglomeration of the suspended lacquer globules. Suitable protective colloids include animal glues, gum arabic, gum tragacanth, starch and similar materials.

The lacquer particles which are suspended and spheroidized in the dense aqueous medium and subsequently solidified by removal of the solvent may be formed by the agitation of a quantity of lacquer in the medium so as to subdivide it into a plurality of lacquer particles of the desired size. Alternatively, presized lacquer particles can be introduced into the aqueous medium. In either case, the forces of agitation are moderate and only sufficient to maintain the suspension, and not of such violence as to subdivide the suspended bodies. When the lacquer particles are formed by breaking down a relatively large volume of the lacquer suspended in the aqueous medium, it has been found advantageous to add the solute to the medium after the lacquer globules have been formed. In this way, an economy of initial agitational force to size the globules is realized while still obtaining the advantages of the invention by spheroidizing and de-solvating the lacquer globules while suspended in a medium having a density substantially equivalent to the density of the globules.

The process of this invention can be readily utilized for the manufacture of relatively large (i.e., above about 0.070 inch) spherical particles of water insoluble organic plastic materials. Thus, this process can be used in forming such spheres having a base of nitrocellulose, polyvinyl chloride, polyvinyl acetate, polyvinyl chloride-acetate copolymers, polystyrene, cellulose acetate butyrate, ethyl cellulose, and other plastic materials. The solvent utilized in forming the lacquer must be substantially water immiscible and may be a single compound or a mixed solvent. The choice of a particular solvent will be dictated by its activity toward the material being treated and to an extent, by the particular method for solvent removal. In most cases, it has been found more expeditious to remove the solvent by distillation. To accomplish this, the solvent must have a boiling point less than the boiling point of water. When the solvent is removed by elutriation or similar means, less volatile solvents or solvent mixtures can be used.

The invention and the manner in which it is carried out will be readily clarified by reference to the drawing which is a flow diagram illustrating the procedural steps of the present process. As indicated at 1, a lacquer is prepared by dissolving an organic plastic material in a substantially water immiscible solvent. Also, an aqueous suspending medium indicated at 2 is formed by dissolving a water soluble solute in water. The amount of solute added is sufficient to substantially equate the densities of the lacquer and of the aqueous medium. The lacquer and aqueous medium are mixed together to form a suspension of the lacquer in the aqueous medium as shown diagrammatically at 4. As the solvent is being removed from the lacquer particles, their density progressively increases. Thus, in order to overcome the tendency of these relatively dense lacquer bodies to settle out of the suspension due to differences in density, the density of the aqueous medium is increased by the addition of increments of solute thereto. When the desolvation of the lacquer particles is complete, the resultant spherical particles of plastic are removed from the suspending medium by any suitable means.

The invention will be more fully understood by reference to the following specific example of a preferred embodiment thereof. In this embodiment, unless otherwise indicated, all proportions are expressed in parts by weight.

In accordance with this preferred embodiment, large diameter, substantially spherical nitrocellulose propellent powder grains were prepared. Approximately 80 parts of fibrous nitrocellulose wet with about 40 parts of water were dissolved in about 180 parts of ethyl acetate to provide approximately 300 parts of a heavy nitrocellulose lacquer. The lacquer also contained about 1% diphenylamine based on the dry weight of nitrocellulose and about 0.25% of chalk, also on the dry nitrocellulose basis. This heavy lacquer was forced through an orifice of 0.080 inch in diameter and sliced in a moving suspending liquid medium into lengths approximating the diameter. This aqueous medium, which was maintained at a temperature of about 60° C. contained about 750 parts water in which about 14 parts of animal glue as a protective colloid and about 27 parts of sodium sulfate were dissolved. In addition, the aqueous medium was prefortified with approximately 15 parts of ethyl acetate to minimize any migration of the solvent from the lacquer into the aqueous medium.

When all of the lacquer had been added to the suspending medium, the suspension was heated to about 65° C. over a half hour period. During this heating period, two part increments of sodium sulfate were added as needed at 5 minute intervals to prevent the lacquer particles from settling to the bottom of the suspending medium. The suspension was maintained at 65° C. from 6 to 7 hours until the suspended lacquer particles had acquired a spherical shape. While the suspension was maintained at 65° C., additional 2 part increments of salt were added whenever any tendency for the lacquer particles to settle became apparent. After the suspended lacquer particles had been spheroidized, the suspension was cooled to approximately 55° C. This was done to increase the viscosity of the suspended lacquer particles and thus insure the preservation of their spherical shape. This cooling also increased the density of the suspended lacquer particles and thus approximately 4 to 8 pounds of sodium sulfate were added to the aqueous medium to prevent the lacquer globules from settling and agglomerating. The suspension was maintained at approximately 55° C. for an additional 5 or 6 hours and the solvent was then removed from the lacquer globules by air stripping. During the air stripping, the temperature of the suspension was gradually raised from 55° C. to 70° C. to expedite the solvent removal. The resultant powder grains were practically spherical and about 62% of them were between 0.094 and 0.078 inch in diameter. This type of powder, which cannot be produced by conventional methods, was particularly well suited for use in larger caliber ammunition.

When the extruded lacquer contains water as indicated above, the lacquer bodies must be subjected to the mild agitation of the water bath for a period of about 3 to 4 hours or more to insure their rounding. When the lacquer is substantially anhydrous, however, the rounding of the cylinders in the bath takes place practically instantaneously.

It will be noted that in the above preferred embodiment, the aqueous suspending medium was prefortified with the solvent used to prepare the lacquer. While this is not essential to the present invention, it is preferable in all cases where there may be any tendency for the solvent to migrate from the suspended lacquer bodies into the aqueous medium. This prefortification tends to prevent surface hardening of the lacquer bodies before they have become spheroidized.

While in the above specific example, the solvent-to-nitrocellulose ratio was approximately 2.25:1 and the ratio of the liquor-to-lacquer was approximately 2.5:1, it will be appreciated by those skilled in the art that such proportions are not critical and can be modified extensively dependent upon the particular components entering the system and upon the type of apparatus used. Although the spherical particles prepared in accordance with the above specific example had a diameter of approximately 0.085 inch, the process of this invention can be readily utilized in making plastic spheres approximately twice as large.

From the foregoing description, those skilled in the art should understand that the invention accomplishes its objects and provides a novel process whereby relatively large spherical bodies of organic plasticizable material may be made with facility and on a large scale and also within a narrow size range. While a complete embodiment has been disclosed in detail and modifications therein suggested, it is to be understood that the example given is for the purpose of illustrating the invention, and not by way of limitation. It is recognized that those skilled in the art will make appropriate adjustment of the several variables in the process in order to adapt it to the peculiarities of any given operation, and consequently it is to be distinctly understood that the invention is not limited to the examples given, save as indicated in the appended claims.

Having thus described the invention, what is claimed and desired to be secured by Letters Patent is:

1. A process for the manufacture of substantially spherical particles of water insoluble organic material having a minimum diameter of about 0.070 inch comprising dissolving the organic material in a substantially water-immiscible solvent to form a lacquer, dissolving a solute in an aqueous medium to provide a solution having substantially the same density as the lacquer, suspending bodies of the lacquer in the aqueous medium containing the solute and in the presence of a protective colloid, maintaining the suspension by agitation until the bodies become substantially spherical, removing the solvent from the suspended lacquer bodies, adding sufficient additional solute to the water during the solvent removal period to substantially equate the densities of the lacquer and the aqueous medium, and separating the particles from the aqueous medium.

2. The process of claim 1 in which the water insoluble organic material is nitrocellulose.

3. A process for the manufacture of substantially spherical particles of water insoluble organic plastic material comprising suspending the organic material and its substantially water-immiscible solvent in an agitated aqueous medium, maintaining the suspension by agitation until the organic material is dissolved in its solvent to form a lacquer, stopping the agitation and permitting the lacquer to coalesce, adding a solute to the aqueous medium to increase its density to approximately the density of the lacquer, agitating the system so as to form globules of lacquer suspended in the aqueous medium, reducing the agitation to the minimum value required to maintain suspension of the globules, maintaining the suspension until the globules become substantially spherical, removing the solvent from the suspended spherical globules, adding solute to the aqueous medium during the solvent removal period to maintain the density of the lacquer and the suspending medium substantially equal, and separating the particles from the suspending medium.

4. In a process for the manufacture of substantially spherical particles of water insoluble organic material by spheroidizing and de-solvating globules of a water-immiscible lacquer of the organic material while suspended in an agitated aqueous medium and subsequently separating the particles from the suspending medium, the improvement which comprises maintaining the densities of the lacquer and the suspending medium substantially equal throughout the process.

5. A process for the manufacture of substantially spherical particles of water insoluble organic material which comprises dissolving the organic material in a substantially water immiscible solvent to form a lacquer, dissolving a solute in an aqueous medium to provide a solution having substantially the same density as the lacquer, suspending bodies of the lacquer in the aqueous medium containing the solute and in the presence of a protective colloid, agitating the suspension until the bodies become substantially spherical, removing the solvent from the suspended lacquer bodies whereby their density is increased, adding increments of the solute to the aqueous medium during the solvent removal period to continually substantially equate the densities of the lacquer and the aqueous medium, and separating the particles from the aqueous medium.

References Cited in the file of this patent
UNITED STATES PATENTS

| | | |
|---|---|---|
| 1,612,167 | Beardsley et al. | Dec. 28, 1926 |
| 1,762,693 | Linebarger | June 10, 1930 |
| 2,027,114 | Olsen et al. | Jan. 7, 1936 |
| 2,213,255 | Olsen et al. | Sept. 3, 1940 |
| 2,722,528 | Johnson | Nov. 1, 1955 |
| 2,740,705 | O'Neill et al. | Apr. 3, 1956 |
| 2,799,897 | Jansen | July 23, 1957 |